(12) United States Patent
Fujiwara et al.

(10) Patent No.: US 6,274,268 B1
(45) Date of Patent: Aug. 14, 2001

(54) POLYMER SECONDARY BATTERY AND METHOD OF MAKING SAME

(75) Inventors: Masaki Fujiwara; Gaku Harada; Shinako Okada; Toshihiko Nishiyama, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/346,047

(22) Filed: Jul. 7, 1999

(30) Foreign Application Priority Data

Jul. 10, 1998 (JP) .................................................. 10-195838

(51) Int. Cl.[7] ...................................................... H01M 4/60
(52) U.S. Cl. .......................... 429/213; 429/212; 429/214
(58) Field of Search ................................ 429/213, 214, 429/212; 29/623.1

(56) References Cited

U.S. PATENT DOCUMENTS 5,324,599 * 6/1994 Oyama et al. ........................ 429/192
5,462,566 * 10/1995 Skotheim ............................ 29/623.1

FOREIGN PATENT DOCUMENTS

| | | |
|---|---|---|
| 3-74051 | 3/1991 | (JP) . |
| 4-146965 | 5/1992 | (JP) . |
| 5-28823 | 2/1993 | (JP) . |
| 5-290852 | 11/1993 | (JP) . |
| 8-109196 | 4/1996 | (JP) . |
| 8-96799 | 4/1996 | (JP) . |
| 9-22733 | 1/1997 | (JP) . |
| 9-92281 | 4/1997 | (JP) . |
| 9-115519 | 5/1997 | (JP) . |

OTHER PUBLICATIONS

Oyama et al., "Organosulfur polymer batteries . . . " Journal of Power Sources, vol. 68, Issue 1, pp. 135–138, Sep. 1997.*

* cited by examiner

Primary Examiner—Carol Chaney
(74) Attorney, Agent, or Firm—Young & Thompson (57) ABSTRACT

A polymer secondary battery uses, for at least one of the active material of positive electrode and the active material of negative electrode, a polymer-carbon composite material including powdered carbon having its surfaces coated with an organic compound polymer capable of adsorbing and desorbing protons electrochemically. The polymer secondary battery has a high rate of appearance of capacity and excellent cycle characteristics.

9 Claims, 2 Drawing Sheets

52 Active material
53 Electrically conducting additive
51 Current collector

POLYMER SECONDARY BATTERY AND METHOD OF MAKING SAME

BACKGROUND OF THE INVENTION

1. Field of the Invention

This invention relates to polymer secondary batteries having a high rate of appearance of capacity and excellent cycle characteristics, and methods of making the same.

2. Description of the Prior Art

Figure 4:
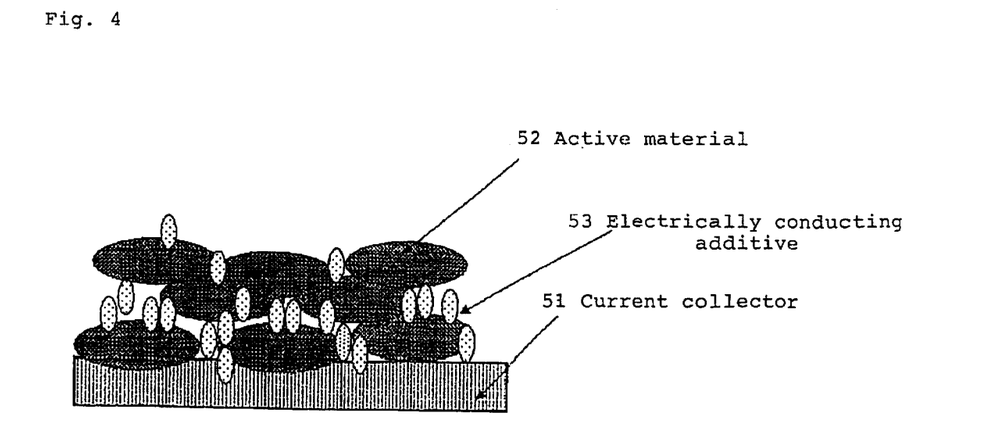
FIG. 4 is a schematic view showing the structure of the polymer and carbon mixture in a conventional polymer secondary battery.

In the positive and negative electrodes of conventional secondary batteries, an electrically conducting additive such as carbon is used together with an electrode active material in order to enhance its electrical conductivity. FIG. 4 is a schematic view showing the structure of such an electrode. An electrically conducting additive 53 is dispersed in a film of an electrode active material 52 which is formed on a current collector 51.

However, the use of an organic compound polymer as an electrode active material involves various problems. They include, for example, low efficiency in the utilization of the active material, a low rate of appearance of battery capacity, and the inability to use a substance having low electronic conductivity as an active material. According to investigations made by the present inventors, organic compound polymers generally have poor electronic conductivity when used as active materials, so that the oxidation-reduction reactions do not proceed rapidly. If it is tried to enhance electrical conductivity by adding an electrically conducting additive in large amounts, the rate of appearance of capacity is reduced owing to a limited amount of the active material. Moreover, it has been found that the mere addition of an electrically conducting additive to an electrode active material fails to impart sufficient electrical conductivity thereto because the area of contact between the carbon and the active material is limited to result in low bond strength.

Meanwhile, it is described in Japanese Patent Laid-Open Nos. 74051/'91 and 290852/'93 that polypyrrole is formed on a carbon electrode by electrolytic polymerization. However, these patents have the disadvantage that, since polypyrrole is formed on a mass of carbon shaped into an electrode, the active material cannot be secured in such an amount as to give a sufficient capacity.

SUMMARY OF THE INVENTION

An object of the present invention is to provide a polymer secondary battery having a high rate of appearance of capacity and excellent cycle characteristics, and another object of the present invention is to provide methods of making the same.

The present invention is directed to a polymer secondary battery using, for at least one of the positive and negative electrodes, a polymer-carbon composite material comprising powdered carbon having its surfaces coated with an organic compound polymer capable of adsorbing and desorbing protons electrochemically.

In one embodiment of the present invention, the aforesaid polymer-carbon composite material is obtained by chemically polymerizing a monomer yielding the organic compound polymer in the presence of the powdered carbon, and removing the solvent from the resulting polymerization product. In this particular embodiment, electrolytic polymerization is not used to produce the organic compound polymer.

In another embodiment of the present invention, the aforesaid polymer-carbon composite material is obtained by dispersing the powdered carbon in a solution of the organic compound polymer, and removing the solvent from the resulting dispersion.

Moreover, the present invention is also directed to a method of making a polymer secondary battery which comprises the steps of providing a polymer-carbon composite material obtained by polymerizing, in the presence of powdered carbon, a monomer yielding an organic compound polymer capable of adsorbing and desorbing protons electrochemically, and removing the solvent from the resulting polymerization product; and fabricating at least one of the positive and negative electrodes by forming a layer of the polymer-carbon composite material on a current collector.

Furthermore, the present invention is also directed to a method of making a polymer secondary battery which comprises the steps of providing a polymer-carbon composite material obtained by dispersing powdered carbon in a solution containing an organic compound polymer capable of adsorbing and desorbing protons electrochemically, and removing the solvent from the resulting dispersion; and fabricating at least one of the positive and negative electrodes by forming a layer of the polymer-carbon composite material on a current collector.

DEFINITION OF SYMBOLS

1 ... Positive electrode current collector
2 ... Positive electrode active material
3 ... Negative electrode active material
4 ... Negative electrode current collector
5 ... Electrolytic solution
6 ... Separator
7 ... Current collector
8 ... Polymer-carbon composite material

DETAILED DESCRIPTION OF THE INVENTION

In the present invention, the substance functioning as the active materials in a strict sense for positive and negative electrodes is an organic compound polymer capable of adsorbing and desorbing protons electrochemically. The adsorption and desorption of protons participates in the oxidation-reduction reactions which are the battery reactions of the organic compound polymer. Such organic compound polymers include π-conjugated polymers containing nitrogen atoms, and polymers of quinones and their derivatives. The π-conjugated polymers containing nitrogen atoms include, for example, polymers of organic compounds having an amino group in the molecule, and polymers of organic compounds having a nitrogen atom in an aromatic ring. The organic compounds which can be used as the monomers constituting these polymers include, for example, aromatic compounds having an amino group in the molecule, such as aniline and dimethylaniline; and compounds having a nitrogen atom in an aromatic ring, such as pyrrole, pyridine, pyrimidine and derivatives thereof.

The compounds which can be used as the monomers constituting the polymers of quinones and their derivatives include, for example, anthraquinone, benzoquinone and derivatives thereof.

Usually, the polymers of these organic compounds are electrical insulators. In order to impart electrical conductivity thereto and thereby make them usable as active materials for batteries, it is necessary to dope them with an organic dopant, an inorganic dopant, or the like. However, the formation of a composite material from such a polymer and carbon according to the present invention makes it easy to impart sufficient electrical conductivity thereto. Consequently, even compounds which have poor electrical conductivity and have failed to exhibit sufficient performance as active materials in the prior art also become usable, so that the range of choice of active materials can be greatly expanded.

In the polymer-carbon composite material (which may hereinafter be referred to briefly as "the composite material") used in the polymer secondary batteries of the present invention, the surfaces of powdered carbon are coated with the above-described organic compound polymer. Consequently, there are neither carbon particles existing separately from the polymer, nor carbon particles having exposed surfaces.

In order to prepare this composite material, a first method comprises oxidatively polymerizing the above-described organic compound serving as a monomer, in the presence of powdered carbon. This may be done, for example, by adding powdered carbon to the polymerization mixture composed of a solution of the organic compound serving as a monomer and a solution of an oxidizing agent, and then effecting polymerization reaction in that state. Thereafter, the polymerization solvent and the like may be removed, for example, by distillation under reduced pressure or atmospheric pressure. For this purpose, it is preferable to use a solvent having as high an affinity for powdered carbon as possible.

According to a second method, the composite material may also be obtained by dispersing powdered carbon in a solution of the above-described organic compound polymer and removing the solvent from the resulting dispersion. For this purpose, it is preferable again to use a solvent having as high an affinity for powdered carbon as possible.

No particular limitation is placed on the type of the powdered carbon, and there may be used any powdered carbon that is commonly used as an electrical conducting additive. Specific examples thereof include particulate carbon having a particle diameter (i.e., the three-dimensionally largest diameter) of about 20 $\mu$m or less and preferably about 5 $\mu$m or less, and fibrous carbon having a diameter of about 0.01 to 10 $\mu$m and a length of about 0.5 to 100 $\mu$m.

The proportion of the polymer to carbon in the composite material may vary according to the desired characteristics. However, it usually ranges from 75:25 to 40:60 (in parts by weight) and preferably from 60:40 to 50:50 (in parts by weight).

In the composite material used in the present invention, the manner in which the carbon and the polymer are bonded together has not been completely elucidated. However, the present inventors presume that the carbon and the polymer are relatively strongly bonded together by chemical or physical means.

In the polymer secondary batteries of the present invention, there are used electrodes fabricated by forming a layer of the above-described composite material on a current collector. These electrodes may be used for one or both of the positive and negative electrodes. As the current collector, there may used any of well-known materials such as electrically conductive rubber sheets and graphite sheets.

No particular limitation is placed on the type of the electrolyte interposed between the two electrodes. There may be used an aqueous or nonaqueous solution containing a proton source, or a solid or gel electrolyte having protonic conductivity.

In the above-described composite material, the increased area of contact enhances the electronic conductivity of the active material and thereby accelerates the oxidation-reduction reactions. Accordingly, the polymer secondary batteries of the present invention using this composite material show high efficiency in the utilization of the active material and an improvement in rate of appearance of battery capacity. Moreover, there may also be used substances which have poor electronic conductivity and have not been used as active materials in the prior art. Furthermore, since the bond between the carbon and the active material is strengthened, an improvement in charge-discharge cycle performance is also achieved.

Now, the present invention is more fully explained with reference to the following examples and comparative examples.

<Example 1>

A 1 M aqueous solution of ammonium 2-peroxodisulfate and a 1 M aqueous solution of aniline monomer were mixed at room temperature for 1 hour to effect polymerization reaction gradually. Then, carbon fibers (having a diameter of 0.05 $\mu$m and a length of 10 $\mu$m) were added to the reaction mixture in an amount corresponding to 50% by weight of the aniline monomer. This mixture was stirred for an additional 6 hours to continue the polymerization reaction. Thereafter, the solvent was distilled off under reduced pressure to prepare an undoped polyaniline-carbon composite material.

Next, after this material was ground to 60 mesh or less in an agate mortar, the polyaniline was doped by adding thereto a 1 M ethanolic solution of p-toluenesulfonic acid (p-TS) and stirring this mixture at 70° C. for 6 hours. Thus, there was obtained a polyaniline-carbon composite material having electrical conductivity.

Figure 1:
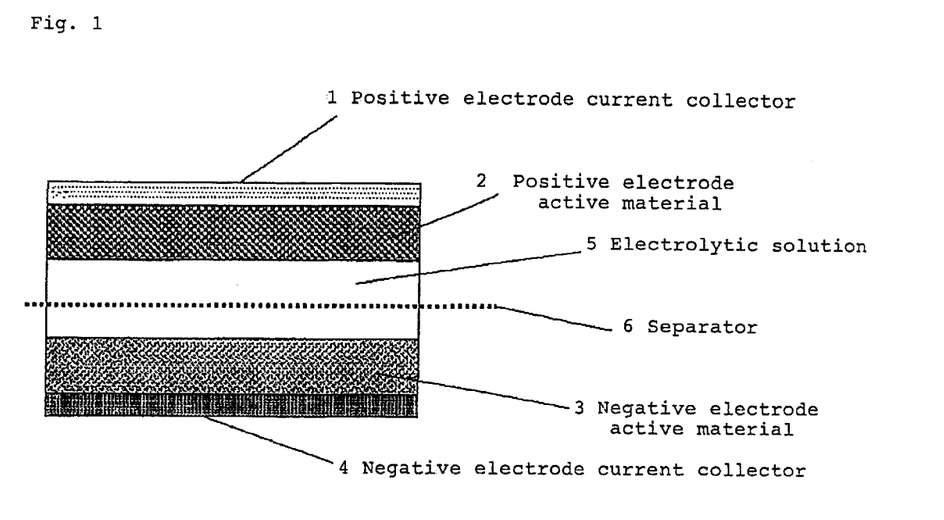
FIG. 1 is a view showing the construction of a polymer secondary battery in accordance with the present invention.

Now, the fabrication and assembly of electrodes are explained with reference to FIG. 1. FIG. 1 is a cross-section view of a battery of this example.

A slurry was prepared by adding N-methyl-2-pyrrolidone (hereinafter referred to as NMP) to 90% by weight of the PAn/p-TS/carbon composite material powder obtained in the above-described manner and 10% by weight of polyvinylidene fluoride (hereinafter referred to as PVDF) used as a binder. Using a positive electrode current collector 1 and a negative electrode current collector 4, both made of electrically conductive rubber, the above slurry was spread thereon to form a layer of a positive electrode active material 2 and a negative electrode active material 3, respectively. These coated current collectors were vacuum-dried at 80° C. to fabricate electrodes having an area of 0.785 cm$^2$. These electrodes were placed in a glass beaker within a bell jar, exposed to a reduced pressure of 40 Torr or less for 30 minutes, and then impregnated with an electrolytic solution comprising a 3M aqueous solution of p-TS poured into the beaker.

Finally, a battery was assembled by stacking the positive and negative electrodes in opposed relationship while interposing therebetween a 20 μm thick polypropylene separator having ion permeability.

In place of the above-described doping method, the polymerization reaction and the doping may simultaneously be effected by allowing a dopant to exist in the reaction mixture containing aniline monomer and an oxidizing agent.

The oxidizing agents which can preferably be used in the above-described procedure include, for example, hydrogen peroxide, chlorates, permanganates, bichromates and peroxodisulfates.

As the aforesaid dopant (X") for imparting electrical conductivity, there may preferably be used, for example, (1) halogens such as chlorine, bromine and iodine, (2) Lewis acids such as copper dichloride, tin tetrachloride and ferric chloride, and (3) proton acids such as sulfuric acid, fluoroboric acid, fluorophosphoric acid, adipic acid, dichloroacetic acid, trifluoroacetic acid, p-toluenesulfonic acid, polystyrenesulfonic acid, polyvinylsulfonic acid and Nafion (trade name).

No particular limitation is placed on the type of the separator, so long as it is made of a porous material having ion permeability.

Now, the operation of the polymer secondary battery of Example 1 is explained below.

(Formula 1)

(Formula 1) represents the charging-discharging reaction mechanism functioning when polyaniline doped with a dopant (designated by X") is used as the positive electrode active material. During an oxidation reaction, electrons on nitrogen atoms are withdrawn from polyaniline and the protons bonded or coordinated to the nitrogen atoms are eliminated and released into the electrolytic solution, so that the aromatic form of polyaniline is converted into a quinoid structure. This oxidation reaction is the charging mechanism of the positive electrode. On the contrary, a reduction reaction takes place in such a way that polyaniline receives electrons from the current collector and protons in the electrolytic solution become adsorbed to nitrogen atoms, so that the quinoid structure of polyaniline is converted into its aromatic form. This reduction reaction is the discharging reaction mechanism of the positive electrode.

The charging-discharging reaction mechanism functioning when PAn/p-TS" is used as the negative electrode active material is the reverse of the above-described mechanism. That is, the reduction reaction occurs during charging and the oxidation reaction occurs during discharging. Although the aromatic form of polyaniline has insulating properties, electronic conductivity manifests itself in polyaniline having a quinoid structure. As a result of further oxidation, polyaniline is doped with anions in the electrolytic solution and converted into a highly oxidized state, so that polyaniline becomes an insulator again. However, this reaction is irreversible as is reported in the Technical and Research Reports of the Society of Electrical Information Communication, 87, 33 (1988). Accordingly, satisfactory cycle characteristics cannot be obtained by utilizing the oxidation-reduction reactions between the oxidized state and the highly oxidized state. In the polymer batteries of the present invention, good cycle characteristics are achieved by utilizing the first-stage oxidation-reduction reactions having reversibility, i.e., oxidation and reduction caused by the adsorption and desorption of protons associated with electron transfer in the active material.

For polyaniline (PAn/p-TS) doped with p-toluenesulfonic acid (p-TS"), it can be seen from the results of elemental analysis (i.e., the molar ratio of nitrogen to sulfur) that the degree of doping was 50%. Accordingly, the molecular weight per monomer unit is estimated to be 176.5 (g/mol). Moreover, since the number of reacting electrons per monomer unit is 0.5, the theoretical capacity is calculated as follows: 26,800 (mAh/mol· eq)×0.5 (eq)/176.5 (g/mol)=76 (mAh/g). The theoretical capacity of the electrode is obtained by multiplying this value by the net weight of the active material.

The theoretical capacity of the constructed battery is defined by the lower one of the theoretical capacities calculated for the positive and negative electrodes. Since PAn/p-TS was used for both electrodes in the battery of Example 1, the value calculated from the amount of active material present in any of the positive and negative electrodes may be used. Here, the value calculated from the net weight of the positive electrode was used.

On the basis of this value, the performance of various batteries was comparatively evaluated with reference to the rate of appearance of capacity at each charge-discharge cycle, and the energy density. The results of tests for the charge-discharge performance and cycle characteristics of the battery of Example 1 are shown in Table 1 (the testing conditions are also shown in Table 1).

<Comparative Example 1>

A polymer secondary battery was constructed in the same manner as in Example 1, except that the polymerization was carried out in the absence of powdered carbon and the same type and amount of powdered carbon as used during the polymerization process in Example 1 was used as an electrically conducting additive. The results of tests for the charge-discharge performance and cycle characteristics of this battery are shown in Table 1 (the testing conditions are also shown in Table 1).

When the performance of the inventive battery of Example 1 is compared with that of the battery of Comparative Example 1, it can be seen that, for the battery constructed according to the conventionally known method of Comparative Example 1, its rate of appearance of capacity is very low in the early stage of cycles and shows a marked decrease as the number of cycles increases, and its discharge current is very low. Its discharge current is unmeasurably low at the second and further cycles, indicating that this battery entirely fails to function as a secondary battery.

In contrast, the battery of Example 1 shows a high rate of appearance of capacity in the initial stage, and no significant decrease in capacity is recognized even if the discharge rate is increased. Moreover, its rate of appearance of capacity after 1,000 cycles is higher than that of Comparative Example 1, and the rate of decrease from its initial value is also low. Thus, it can be seen that this is a battery having a high rate of appearance of capacity and excellent cycle characteristics.

Figure 2:
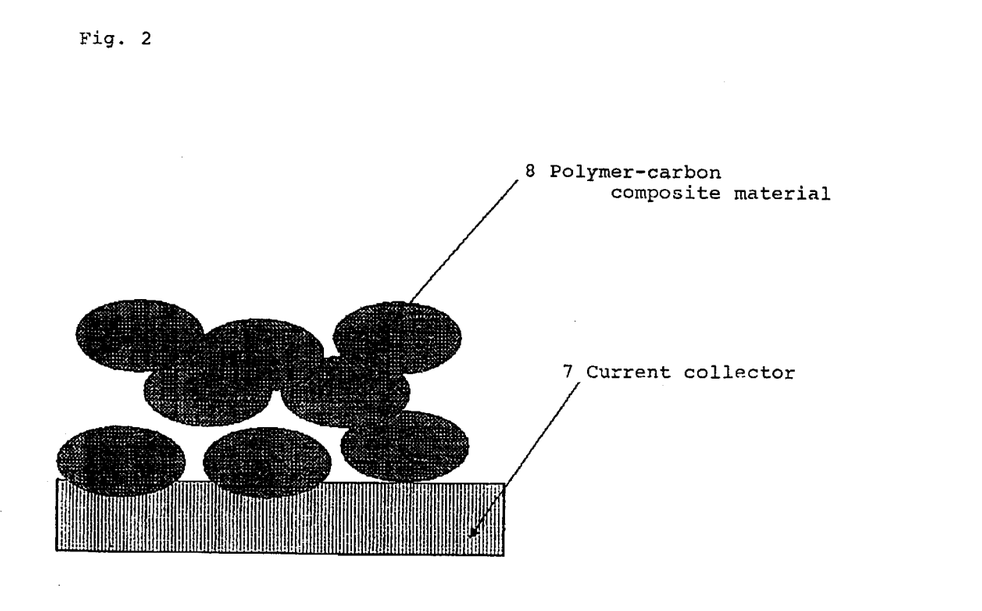
FIG. 2 is a schematic view showing the structure of the polymer-carbon composite material in the polymer secondary battery of the present invention.

The present inventors consider that the reason for this is as follows. FIG. 2 is a schematic view showing the electrode structure in the battery of this example. When this figure is compared with FIG. 4 schematically showing the conventional structure, it can be seen that, in the conventional structure shown in FIG. 4, particulate carbon used as the electrically conducting additive 53 exists in the form of particles clearly separate from the active material 52, whereas in the structure of the present invention, the composite material 8 comprising carbon particles having its surfaces coated with a polymer used as an active material exists in the form of integrally formed particles or aggregates instead of existing in the form of particles separate from the active material.

Thus, when a composite material is formed from carbon and a polymer according to the present invention, good electronic conductivity can be secured throughout the electrodes. As a result, the need of carbon powder which has been separately added as an electrically conducting additive in the conventionally known method for the fabrication of electrodes is eliminated. This makes it possible to increase the weight of the active material and facilitate the achievement of a high capacity. Consequently, it is believed that, as a first effect, there can be obtained a battery having high efficiency in the utilization of the active material and a high rate of appearance of capacity.

A second effect of the present invention is that good cycle characteristics can be obtained. When a polymer which permits energy to be produced from the acceptance and donation of electrons attendant on the adsorption and desorption of protons is used according to the present invention, the battery is characterized in that the ion size of protons serving as charge carriers is smaller as compared with other ions such as alkali metal ions, and this minimizes volume changes or structural changes of the electrode active material due to the adsorption and desorption of protons, and an increase in contact resistance at the electrode/current collector interface which results from volume changes of the active material. Especially when polyaniline doped with p-toluenesulfonic acid is used according to the present invention, it is one of the reasons for excellent cycle characteristics that the battery is operated in a potential range which does not cause overoxidation in an aqueous solution.

It is a further reason peculiar to the present invention that, since a composite material is formed from carbon and a polymer, the area of bonding or contact between the active material and the carbon is increased and, therefore, a strong bond is secured from both electrical and mechanical points of view. This can minimize a reduction in bond strength and an increase in contact resistance, at the active material/electrically conducting additive interface and the electrode/current collector interface, which may occur as a result of repeated charge-discharge cycles. For the foregoing reasons, the present invention makes it possible to achieve good cycle characteristics.

<Example 2>

Polymers of pyridine, pyrimidine and other compounds having a nitrogen atom in an aromatic ring are characterized in that protons are adsorbed to or desorbed from nitrogen atoms in their π-conjugated system, resulting in the acceptance or donation of electrons. However, these compounds have such low electronic conductivity that it has been impossible to draw out their capacity to the fullest extent. The method for forming a composite material from carbon and an organic compound polymer according to the present invention makes it possible to secure sufficient electronic conductivity, and is hence characterized in that not only electrically conductive polymeric compounds such as the above-described polyaniline, but also polymers of organic compounds having highly insulating properties can be used as active materials for batteries.

In Example 2, a composite material formed from polypyridine (hereinafter referred to as Ppy) and carbon was used in place of PAn/p-TS and carbon used as the negative electrode active material in Example 1. The Ppy-carbon composite material serving as the active material was prepared according to the following procedure.

An equal weight of active carbon fibers were added to a powder of Ppy which had been synthesized by chemical polymerization using a Ni catalyst. Moreover, a 3M aqueous solution of formic acid was added thereto. This mixture was stirred at room temperature for 6 hours. After residual Ni was removed, the solvent was distilled off. The resulting product was ground to 60 mesh or less in an agate mortar. Thus, there was obtained a Ppy-carbon composite material.

As the positive electrode active material, PAn was used in the same manner as in Example 1. However, as the dopant for imparting electrical conductivity thereto, polyvinylsulfonic acid (PVS") was used in place of p-TS. Specifically, an undoped PAn-carbon composite material was prepared in the same manner as in Example 1. Thereafter, PAn was doped by adding thereto a 3M aqueous solution of PVS" and stirring this mixture in a hot water bath at 70° C. for 6 hours. The doped material was washed with hot water at 70° C. and vacuum-dried at 80° C. for 1 hour. Thus, there was obtained a PAn/PVS-carbon composite material.

Positive and negative electrodes were fabricated in substantially the same manner as in Example 1. Specifically, a slurry was prepared by adding an appropriate amount of N-methyl-2-pyrrolidone (NMP) to 90% by weight of the composite material powder used as the positive electrode active material 2 or the negative electrode active material 3 and 10% by weight of polyvinylidene fluoride (PVDF) used as a binder.

Using a positive electrode current collector 1 and a negative electrode current collector 4, both made of electrically conductive rubber, the above slurry was spread thereon so as to form a layer. These coated current collectors were vacuum-dried at 80° C. to fabricate positive and negative electrodes having an area of 0.785 cm$^2$.

Then, in the same manner as in Example 1, these positive and negative electrodes were impregnated with an electrolytic solution comprising a 3M aqueous solution of PVS". Finally, a polymer secondary battery was assembled by stacking the positive and negative electrodes in opposed relationship while interposing therebetween a separator made of polypropylene.

Now, the operation of the polymer secondary battery of Example 2 is explained below.

First of all, the charging-discharging mechanism for PAn/PVS used as the positive electrode active material is substantially the same as described in Example 1. That is, as shown in (Formula 1), during a first oxidation reaction, electrons on nitrogen atoms are withdrawn from polyaniline and the protons bonded or coordinated to the nitrogen atoms are eliminated and released into the electrolytic solution, so that the aromatic form of polyaniline is converted into a quinoid structure. This oxidation reaction is the charging mechanism of the positive electrode. On the contrary, a reduction reaction takes place in such a way that polyaniline receives electrons from the current collector and protons in the electrolytic solution become adsorbed to nitrogen atoms, so that the quinoid structure of polyaniline is converted into its aromatic form. This reduction reaction is the discharging mechanism of the positive electrode.

On the other hand, the charging-discharging reaction mechanism for polypyridine used as the negative electrode active material is similar in that, as shown in (Formula 2), protons are adsorbed to or desorbed from nitrogen atoms in the π-conjugated system, resulting in the acceptance or donation of electrons. During a reduction reaction, polypyridine receives electrons and, as the same time, protons become adsorbed or coordinated to nitrogen atoms in the aromatic ring. This is the reaction taking place during charging. On the contrary, the discharging (oxidation) reaction is such that electrons are withdrawn from nitrogen atoms in the aromatic ring and, at the same time, protons are eliminated and released into the solution. This is the charging-discharging reaction mechanism for polypyridine.

(Formula 2)

The theoretical capacity of the battery of Example 2 is determined in the follow manner. For polyaniline (PAn/PVS) doped with polyvinylsulfonic acid (PVS") which constitutes the positive electrode, it can be seen from the results of elemental analysis (i.e., the molar ratio of nitrogen to sulfur) that the degree of doping was 50%. Accordingly, the molecular weight per monomer unit is estimated to be 144.5 (g/mol). Moreover, since the number of reacting electrons per monomer unit is 0.5, the theoretical capacity is calculated as follows: 26,800 (mAh/mol· eq)×0.5 (eq)/144.5 (g/mol)=92.5 (mAh/g). The theoretical capacity of the positive electrode is obtained by multiplying this value by the net weight of PAn/PVS.

For polypyridine (Ppy) constituting the negative electrode, the molecular weight per monomer unit is estimated to be 77 (g/mol). Moreover, since the number of reacting electrons per monomer unit is 1, the theoretical capacity is calculated as follows: 26,800 (mAh/mol· eq)×1 (eq)/77 (g/mol)=348.1 (mAh/g). The theoretical capacity of the negative electrode is obtained by multiplying this value by the net weight of Ppy. In Example 2, the battery was constructed in such a way the molar ratio of the positive and negative electrodes was 1:1. Consequently, its theoretical capacity is defined by the capacity of the positive electrode having a smaller value.

The results of tests for the charge-discharge performance and cycle characteristics of this battery are shown in Table 1 (the testing conditions are also shown in Table 1).
<Comparative Example 2>

A polymer secondary battery was constructed in the same manner as in Example 2, except that the polymerization was carried out in the absence of powdered carbon and the same type and amount of powdered carbon as used during the polymerization process in Example 2 was used as an electrically conducting additive. The results of tests for the charge-discharge performance and cycle characteristics of this battery are shown in Table 1 (the testing conditions are also shown in Table 1).

When the performance of the inventive battery of Example 2 is compared with that of the battery of Comparative Example 2, it can be seen that the battery of Example 2 is superior to the battery of Comparative Example 2 in rate of appearance of capacity and cycle performance. In particular, the battery of Example 2 is found to have a high energy density. The reason for this is explained below with reference to FIG. 3.

Figure 3:
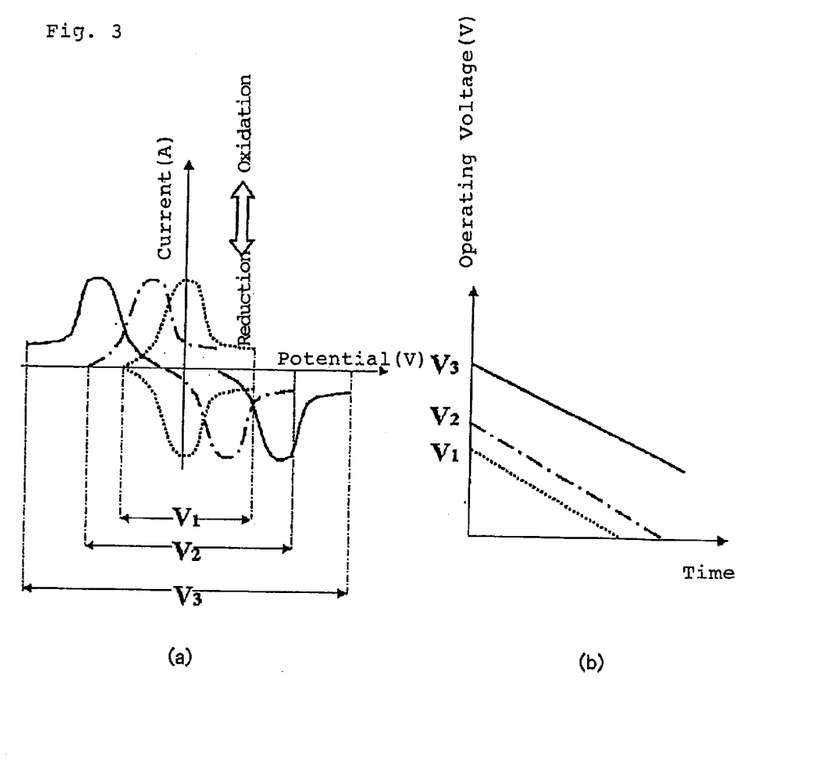
FIG. 3 is a graph showing the oxidation-reduction potentials of the positive and negative electrodes and the operating voltage of the battery.

The energy density of a battery is defined by the product of its capacity and its average operating voltage. The operating voltage of a battery is determined by the difference between the oxidation-reduction potentials of the positive and negative electrode active materials, as described in J. Power Sources, 47, 89 (1994). As schematically shown in FIG. 3, the operating voltage is determined by the oxidation-reduction potential difference between the positive and negative electrodes, depending on the combination of the positive electrode active material using a reduction current on the higher potential side and the negative electrode active material using an oxidation current on the lower potential side. Accordingly, the operating voltage of a battery can be raised by selecting materials which increase the oxidation-reduction potential difference between the positive and negative electrodes.

More specifically, for a battery having a large potential difference between the reduction current peak of the positive electrode and the oxidation current peak of the negative electrode as shown in FIG. 3(a), its terminal voltage V3 (corresponding to the electromotive force of the battery) is high at the start of discharging. As the discharging reaction proceeds, the reduction current peak of the positive electrode and the oxidation current peak of the negative electrode are consumed as shown in FIG. 3(a), and the potential difference between both electrodes is narrowed. Consequently, the terminal voltage is gradually lowered as shown in FIG. 3(b). The previously described battery of Example 1 using polyaniline for both of the positive and negative electrodes has a low operating voltage (corresponding to the electromotive force V1 shown in FIG. 3(b)). In contrast, the battery of this Example 2 has a high operating voltage (corresponding to the electromotive force V3 shown in FIG. 3(b)) because the oxidation-reduction potential of polypyridine used for the negative electrode lies on the lower potential side than the oxidation-reduction potential of polyaniline used for the positive electrode. For the foregoing reason, Example 2 can provide a battery having a higher energy density than Example 1.
<Example 3>

In Example 3, the combination of positive and negative electrode active materials was the same as in Example 2, but the electrolytic solution comprised an ethylene carbonate (EC) solution containing 1 M fluoroboric acid as a proton source. The fabrication of positive and negative electrodes and the assembly of a battery were carried out in the same manner as in Example 2.

The oxidation-reduction reactions of polyaniline in a nonaqueous solvent such as ethylene carbonate differ from those in an aqueous solution. That is, they are characterized in that, in addition to the adsorption and desorption of protons attendant on the reaction between the reduced state and the oxidized state as described in connection with (formula 1), doping and undoping with anions in the electrolytic solution occur reversibly between the oxidized state and the highly oxidized state. This is advantageous in that the operating voltage can be raised as compared with aqueous solution systems. However, an essential feature of the batteries of the present invention is that protons adsorbed to and desorbed from polyaniline or polypyridine are used as charge carriers, and the doping and undoping reactions of anions produced in the electrolytic solution in a high-potential region are not utilized. Consequently, the operating principle of the battery of this Example 3 is the same as that of Example 2.

The theoretical capacity of the battery of Example 3 can be calculated in the same manner as in Example 2. The results of tests for the charge-discharge performance and cycle characteristics of this battery are shown in Table 1 (the testing conditions are also shown in Table 1).

<Comparative Example 3>

A polymer secondary battery was constructed in the same manner as in Example 3, except that the polymerization was carried out in the absence of powdered carbon and the same type and amount of powdered carbon as used during the polymerization process in Example 3 was used as an electrically conducting additive. The results of tests for the charge-discharge performance and cycle characteristics of this battery are shown in Table 1 (the testing conditions are also shown in Table 1).

When the performance of the inventive battery of Example 3 is compared with that of the battery of Comparative Example 3, it can be seen that the battery of Example 3 is superior to the battery of Comparative Example 3 in rate of appearance of capacity, cycle performance and energy density.

The reason for the first effect (i.e., an improvement in rate of appearance of capacity) is that, by depositing an active material (i.e., PAn/PVS or Ppy) on the surfaces of carbon according to the above-described method for forming a composite material, good electrical conductivity can be secured throughout the electrodes.

The reason for the second effect (i.e., an improvement in cycle performance) is that, by depositing an active material (i.e., PAn/PVS or Ppy) on the surfaces of carbon according to the above-described method for forming a composite material, the area of bonding or contact between the active material and the carbon is increased and, therefore, a strong bond is secured from both electrical and mechanical points of view.

A third effect peculiar to this Example 3 is that the battery shows an rise in operating voltage and an enhancement in energy density. The reason for this is that, since a nonaqueous solvent (i.e., ethylene carbonate) was used, the oxidation-reduction reactions due to proton adsorption to and desorption from polyaniline used for the positive electrode and the oxidation-reduction reactions due to doping and undoping with anions in the electrolytic solution yield a larger potential difference and, moreover, all of these reactions are reversible. Thus, the operating voltage can be raised as compared with aqueous solution systems.

<Example 4>

Example 4 relates to a battery of an aqueous solution type in which a composite material formed from poly(1,5-anthraquinone (hereinafter referred to as P(1,5-AQ)) and carbon was used for the positive electrode and a composite material formed from Ppy and carbon is used for the negative electrode. Quinones are characterized in that the number of reacting electrons per molecule is as much as 2 and a high capacity can be drawn as a result of oxidation-reduction reactions. Accordingly, they have conventionally formed a subject of investigations on the improvement of the energy density of a battery. However, these quinones have the disadvantage that they have very low electronic conductivity and, when used as active materials for batteries, they tend to diffuse out into the electrolystic solution over time owing to their low molecular weights. Consequently, it has been impossible to use them alone as active materials for batteries.

In this Example 4, the use of a quinone as an active material for batteries was made possible by preparing a quinone polymer to secure stability in an electrolytic solution, and forming a composite material from this quinone polymer and carbon to impart electrical conductivity thereto. The procedure for preparing the composite material is described below.

First of all, an organic nickel complex such as bis(1,5-cyclooctadiene)nickel was allowed to act on 1,5-dichloroanthraquinone, and dimethylformamide (hereinafter referred to as DMF) was added thereto. While this mixture was maintained at 60° C., an equal weight of carbon fibers were added thereto, followed by stirring. Thus, P(1,5-AQ) was formed on the surfaces of the carbon fibers. After the unreacted residue was removed by washing with DMF, the product was vacuum-dried at 80° C. to obtain a P(1,5-AQ)-carbon composite material. This was used for a positive electrode.

On the other hand, a negative electrode was fabricated in substantially the same manner as in Example 2. Specifically, a slurry was prepared by adding an appropriate amount of DMF to 90% by weight of the composite material powder obtained in Example 2 and used as the positive electrode active material and 10% by weight of polyvinylidene fluoride (PVDF) used as a binder. Then, this slurry was spread on a current collector made of electrically conductive rubber so as to form a layer. Thereafter, This coated current collector was vacuum-dried at 80° C. to fabricate a negative electrode having an area of 0.785 cm².

A positive electrode was fabricated in exactly same manner as in Example 2. Moreover, in the same manner as in Example 2, these positive and negative electrodes were impregnated with an electrolytic solution comprising a 3M aqueous solution of PVS". Finally, the battery of Example 4 was assembled by stacking the positive and negative electrodes in opposed relationship while interposing therebetween a separator made of polypropylene.

Since a 3M aqueous solution of PVS" is used as the electrolytic solution in Example 4, the operating principle of Ppy used for the negative electrode is the same as described in Example 2.

The reaction mechanism of P(1,5-AQ) used for the positive electrode is explained below with reference to (Formula 3).

(Formula 3)

During the oxidation of P(1,5-AQ), electrons are withdrawn from the double bond sites, so that the bonds are cleaved and the oxygen atoms are negatively charged. These oxygen atoms are combined with protons in the solution to form hydroxyl groups. This is the charging reaction mechanism functioning when P(1,5-AQ) is used as the positive electrode active material. As a result of reduction, double bonds are formed again and the protons are released into the solution. This is the discharging reaction mechanism functioning when P (1, 5-AQ) is used as the negative electrode active material.

First, the theoretical capacity of the positive electrode of Example 4 is as follows. For P(1,5-AQ) constituting the positive electrode, the molecular weight per monomer unit is 206.2 (g/mol) and the number of reacting electrons per monomer unit is 2. Consequently, the theoretical capacity is calculated as follows: 26,800 (mAh/mol· eq)×2 (eq)/206.2 (g/mol)=260 (mAh/g). The theoretical capacity of the positive electrode is obtained by multiplying this value by the net weight of the positive electrode.

On the other hand, for Ppy constituting the negative electrode, the theoretical capacity is 348.1 (mAh/g) as described in Example 2. In Example 4, the battery was constructed in such a way the molar ratio of the positive and negative electrodes was 1:1. Consequently, its theoretical capacity is defined by the capacity of the positive electrode comprising P (1,5-AQ) and having a smaller value.

The results of tests for the charge-discharge performance and cycle characteristics of this battery are shown in Table 1 (the testing conditions are also shown in Table 1).

<Comparative Example 4>

A polymer secondary battery was constructed in the same manner as in Example 4, except that the polymerization was carried out in the absence of powdered carbon and the same type and amount of powdered carbon as used during the polymerization process in Example 4 was used as an electrically conducting additive. The results of tests for the charge-discharge performance and cycle characteristics of this battery are shown in Table 1 (the testing conditions are also shown in Table 1).

When the performance of the inventive battery of Example 4 is compared with that of the battery of Comparative Example 4, it can be seen that the battery of Example 4 has a higher rate of appearance of capacity and more excellent cycle performance.

A first effect of this example is an improvement in cycle performance. One reason for this is believed to be that, since a polymer of anthraquinone having a high molecular weight is used, its chemical stability is increased to minimize its diffusion into the electrolytic solution with the passage of time. Another reason is that, owing to the formation of a composite material from the polymer and carbon, the area of bonding or contact with P(1,5-AQ) and carbon is increased and a strong bond is secured from both electrical and mechanical points of view.

A second effect is that there is obtained a battery having a high energy density. One reason for this is that the number of reacting electrons in the oxidation-reduction reactions of P(1,5-AQ) is as much as 2 and, therefore, a higher capacity per unit weight can be obtained. Another reason is believed to be that, while P(1,5-AQ) has poor electronic conductivity and the conventionally known method has failed to draw out its capacity to the fullest extent, the formation of a composite material according to the present invention can impart electronic conductivity to P(1,5-AQ) and thereby cause its oxidation-reduction reactions to proceed rapidly.

<Example 5>

Example 5 relates to a battery in which a gel electrolyte prepared by adding a small amount of an ethylene carbonate (EC) solution containing 1 M fluoroboric acid (as used in Example 3) to a solid electrolyte (i.e., Nafion (trade name)) having protonic conductivity was used in place of the 3M aqueous solution of PVS" used as the electrolytic solution in the battery of Example 2. The fabrication of positive and negative electrodes and the assembly of a battery were carried out in the same manner as in Example 2.

The oxidation-reduction reactions occurring in the positive and negative electrodes of the battery of Example 5 are the same as described in Example 2. The only difference is that the proton source comprises a gel electrolyte instead of an electrolytic solution.

The results of tests for the charge-discharge performance and cycle characteristics of this battery are shown in Table 1 (the testing conditions are also shown in Table 1).

<Comparative Example 5>

A polymer secondary battery was constructed in the same manner as in Example 5, except that the polymerization was carried out in the absence of powdered carbon and the same type and amount of powdered carbon as used during the polymerization process in Example 5 was used as an electrically conducting additive. The results of tests for the charge-discharge performance and cycle characteristics of this battery are shown in Table 1 (the testing conditions are also shown in Table 1).

When the performance of the inventive battery of Example 5 is compared with that of the battery of Comparative Example 5, it can be seen that the battery of Example 5 is superior to the battery of Comparative Example 5 in charge-discharge performance and cycle characteristics. The battery of Example 5 has a slightly lower rate of appearance of capacity than the batteries of other examples. The reason for this is that the ionic conductivity of a gel electrolyte is lower than that of a solution by several orders of magnitude.

However, the use of a gel electrolyte in Example 5 can prevent fluid leakage from the battery. This eliminates the necessity of packaging in a metallic case and permits the use of a simplified package, making it possible to provide batteries having the form of a flexible film.

TABLE 1

Comparison of the Performance of the Batteries of Examples and Comparative Examples

|  | Charging and discharging conditions | 5th cycle Capacity (mAh) Rate of appearance of capacity (%) | 1000th cycle Capacity (mAh) Rate of appearance of capacity (%) | Energy density (Wh/kg) |
|---|---|---|---|---|
| Example 1 | Charged at 0.5 V for 300 sec. | 1.0 (mAh) 52.6% | 0.6 (mAh) 31.5% | 0.1 (Wh/kg) — |
| Comparative Example 1 | Discharged at 0.1 C. | 0.19 (mAh) 10.1% | — |  |

TABLE 1-continued

Comparison of the Performance of the Batteries
of Examples and Comparative Examples

|  | Charging and discharging conditions | 5th cycle Capacity (mAh) Rate of appearance of capacity (%) | 1000th cycle Capacity (mAh) Rate of appearance of capacity (%) | Energy density (Wh/kg) |
| --- | --- | --- | --- | --- |
| Example 2 | Charged at 0.9 V for 300 sec. | 0.91 (mAh) 40.0% | 0.82 (mAh) 35.5% | 1.9 (Wh/kg) |
| Comparative Example 2 | Discharged at 0.1 C. | 0.19 (mAh) 10.1% | — | — |
| Example 3 | Charged at 3.5 V for 300 sec. | 0.26 (mAh) 11.4% | 0.22 (mAh) 9.6% | 33.5 (Wh/kg) |
| Comparative Example 3 | Discharged at 0.1 C. | 0.20 (mAh) 8.8% | 0.15 (mAh) 6.5% | 25.6 (Wh/kg) |
| Example 4 | Charged at 0.8 V for 300 sec. | 0.95 (mAh) 41.3% | 0.66 (mAh) 28.7% | 2.3 (Wh/kg) |
| Comparative Example 4 | Discharged at 0.1 C. | 0.23 (mAh) 10.1% | — | 0.36 (Wh/kg) |
| Example 5 | Charged at 0.9 V for 300 sec. | 0.48 (mAh) 16.1% | 0.46 (mAh) 15.5% | 0.9 (Wh/kg) |
| Comparative Example 5 | Discharged at 0.1 C. | 0.39 (mAh) 13.0% | 0.21 (mAh) 7.0% | 0.72 (Wh/kg) |

Thus, the present invention can provide polymer secondary batteries having a high rate of appearance of capacity and excellent cycle characteristics, and methods of making the same.

What is claimed is:

1. A polymer secondary battery using, for at least one of the active material of positive electrode and the active material of negative electrode, a porous polymer-carbon composite material comprising powdered carbon having its surfaces coated with an organic compound polymer capable of adsorbing and desorbing protons electrochemically when the battery is being operated.

wherein said polymer-carbon composite material is obtained by chemically polymerizing a monomer yielding said organic compound polymer in the presence of said powdered carbon, and removing the solvent from the resulting polymerization product.

2. A polymer secondary battery as claimed in claim 1 wherein said organic compound polymer is a π-conjugated polymer containing nitrogen atoms.

3. A polymer secondary battery as claimed in claim 2 wherein said π-conjugated polymer containing nitrogen atoms is a polymer of an organic compound having an amino group in the molecule.

4. A polymer secondary battery as claimed in claim 2 wherein said π-conjugated polymer containing nitrogen atoms is a polymer of an organic compound having a nitrogen atom in an aromatic ring.

5. A polymer secondary battery using, for at least one of the active material of positive electrode and the active material of negative electrode, a polymer-carbon composite material comprising powdered carbon having its surfaces coated with an organic compound polymer capable of adsorbing and desorbing protons electrochemically when the battery is being operated.

wherein said organic compound polymer is a polymer selected from among polymers of quinones.

6. A polymer secondary battery as claimed in claim 2 wherein said organic compound polymer is a polymer selected from among polymers of quinones.

7. A polymer secondary battery using, for at least one of the active material of positive electrode and the active material of negative electrode, a polymer-carbon composite material comprising powdered carbon having its surfaces coated with an organic compound polymer capable of adsorbing and desorbing protons electrochemically when the battery is being operated, wherein said polymer battery further comprises a proton-containing electrolyte selected from the group consisting of an aqueous solution, a nonaqueous solution, a solid electrolyte and a gel electrolyte.

8. A polymer secondary battery as claimed in claim 1 wherein said polymer battery further comprises a proton-containing electrolyte selected from the group consisting of an aqueous solution, a nonaqueous solution, a solid electrolyte and a gel electrolyte.

9. A method of making a polymer secondary batter which comprises the steps of providing a polymer-carbon composite material obtained by chemically polymerizing, in the presence of powdered carbon, a monomer yielding an organic compound polymer capable of adsorbing and desorbing protons electrochemically during operation of the battery, and removing the solvent from the resulting polymerization product; and fabricating at least one of the positive and negative electrodes by forming a layer of said polymer-carbon composite material on a current collector.

* * * * *